UNITED STATES PATENT OFFICE.

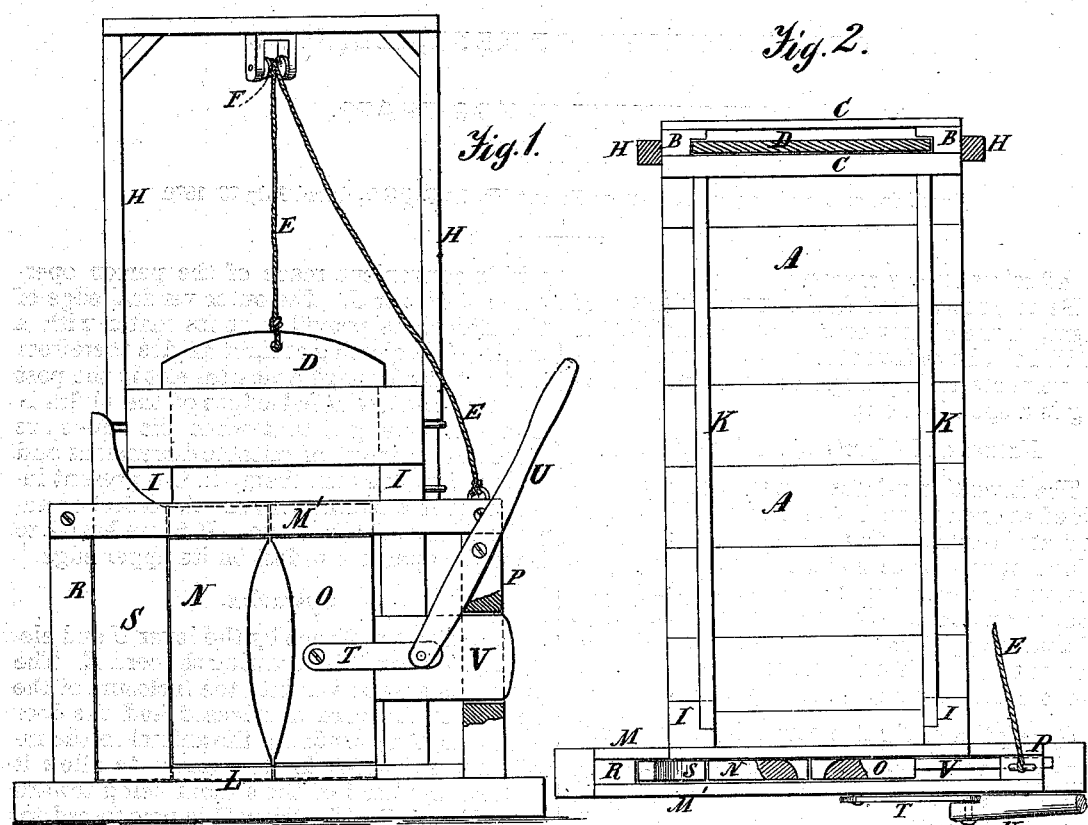
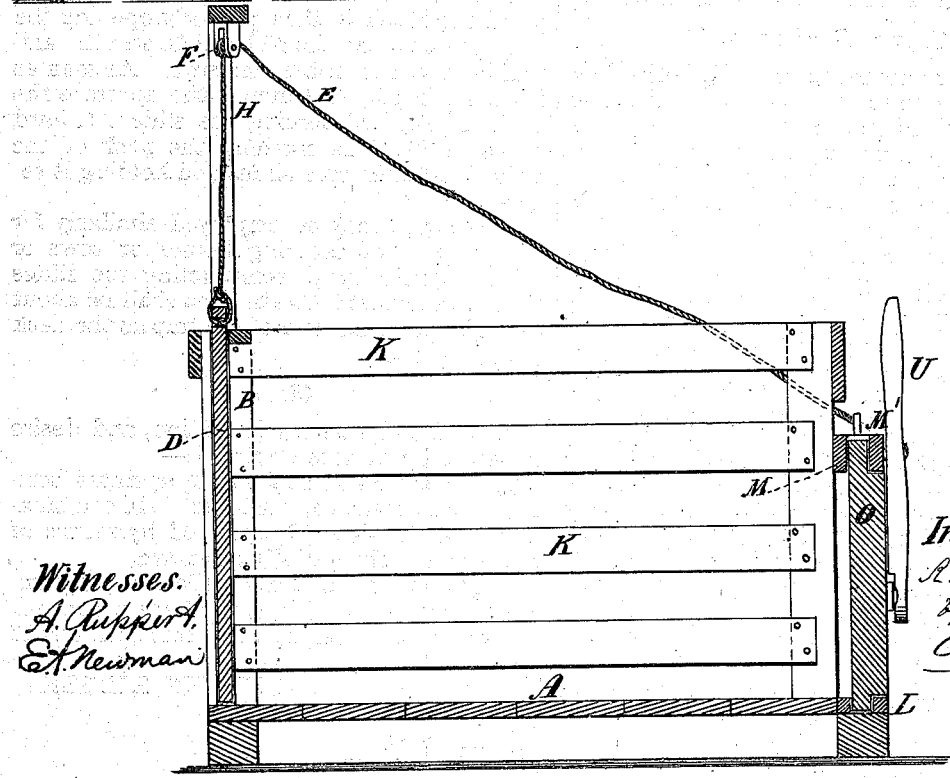

REUBEN KIELER, OF KENT, ILLINOIS.

IMPROVEMENT IN HOG-TRAPS.

Specification forming part of Letters Patent No. 129,832, dated July 23, 1872.

*To all whom it may concern:*

Be it known that I, REUBEN KIELER, of Kent, in the county of Stephenson and State of Illinois, have invented new and useful Improvements in Hog-Traps, of which the following is a specification:

Nature and Objects of the Invention.

The invention relates to a trap or pen, provided at one end with a vertically-sliding door and at the other with a lever outside the trap, which operates the slide, and so working in grooves and serving to catch and hold an animal in an aperture between its edge and that of a slide opposite. The object of the invention is to provide a means of holding an animal securely for any desired purpose.

Description of the Accompanying Drawing.

Figure I is a front view of the invention. Fig. II is a plan view of the floor of the same. Fig. III is a side sectional view of the same.

General Description.

A in the accompanying drawing is the floor of the pen, at one end of which are erected the posts B, provided on their inner and opposite surfaces with a groove. The upper parts of the posts B are connected by the bars C, a space intervening between them. The door D is of such dimensions as to slide freely between the posts B, and is provided at the center of its upper edge with a cord, E, which passes over a pulley-wheel, F, in the under side of the frame H, the lower ends of the side pieces of which are secured in staples on the outside of the upper parts of the posts B. The opposite end of the device is provided with the posts I, standing opposite the posts B, and connected therewith by the rails K. To the outside of the posts I is secured the slotted sill L, upon which, and between the bars M, the slides N and O move, the ends of the sill and bars M M' being connected by the posts P R. The chock S is placed between the outer vertical edge of the slide N and the post R, and serves to regulate the size of the aperture between the inner and vertical edges of the slides. To the outside of the slide O is affixed one end of the arm T, the opposite end of which is pivoted to the lower end of the lever U, having a handle at its opposite end. The end of the cord E is secured so as to be within convenient reach of the person operating the lever U. The outer vertical edge of the slide O is provided at its center with a guide, V, projecting at right angles therefrom and passing through a vertical slot in the post P. The inner vertical edges of the slides N O are so arranged that when the slides are closed an aperture of suitable dimensions and form is left between them; in the present instance it is a double convex. A conical or angular form will also serve. It is preferable to have the aperture widest on its upper edge.

Operation.

The operator stands by the lever U and elevates the door D by drawing the cord E. The animal is now driven into the inclosure of the pen, when the cord is released and the door descends, thus confining the animal in the inclosure, and which is too narrow to allow it to turn, the head of the animal being toward the slides N O. The lever U is now forced toward the chock S, thus properly opening the aperture between the slides N O, and the animal is driven from the inclosure. As soon as its head is passed through the aperture the lever is retracted, forcing the slide O toward the slide N, thus catching the neck of the animal between said slides and holding it securely.

The device may be employed similarly for the purpose of securing horses or cows or other animals by so constructing the slides that the aperture between them shall be about as high above the floor of the trap as the neck of the animal.

Claim.

What I claim as my invention, and desire to secure by Letters Patent, is—

The chock S and slides N O, operated horizontally by means of the lever U, in combination with the door D, operated by means of the cord E, substantially as shown.

In testimony that I claim the foregoing improvements in hog-traps, as above described, I have hereunto set my hand this 28th day of May, 1872.

REUBEN KIELER.

Witnesses:
Z. STOVER,
NORRIS WARD.